June 15, 1954  H. J. FORTENER  2,681,251
LIQUID DISPENSING APPARATUS
Filed June 12, 1948
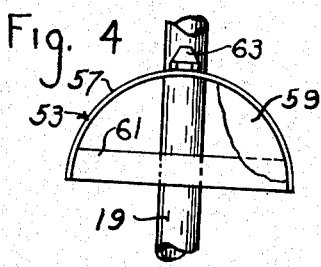
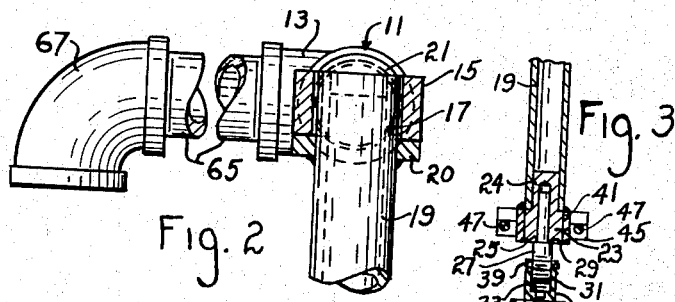
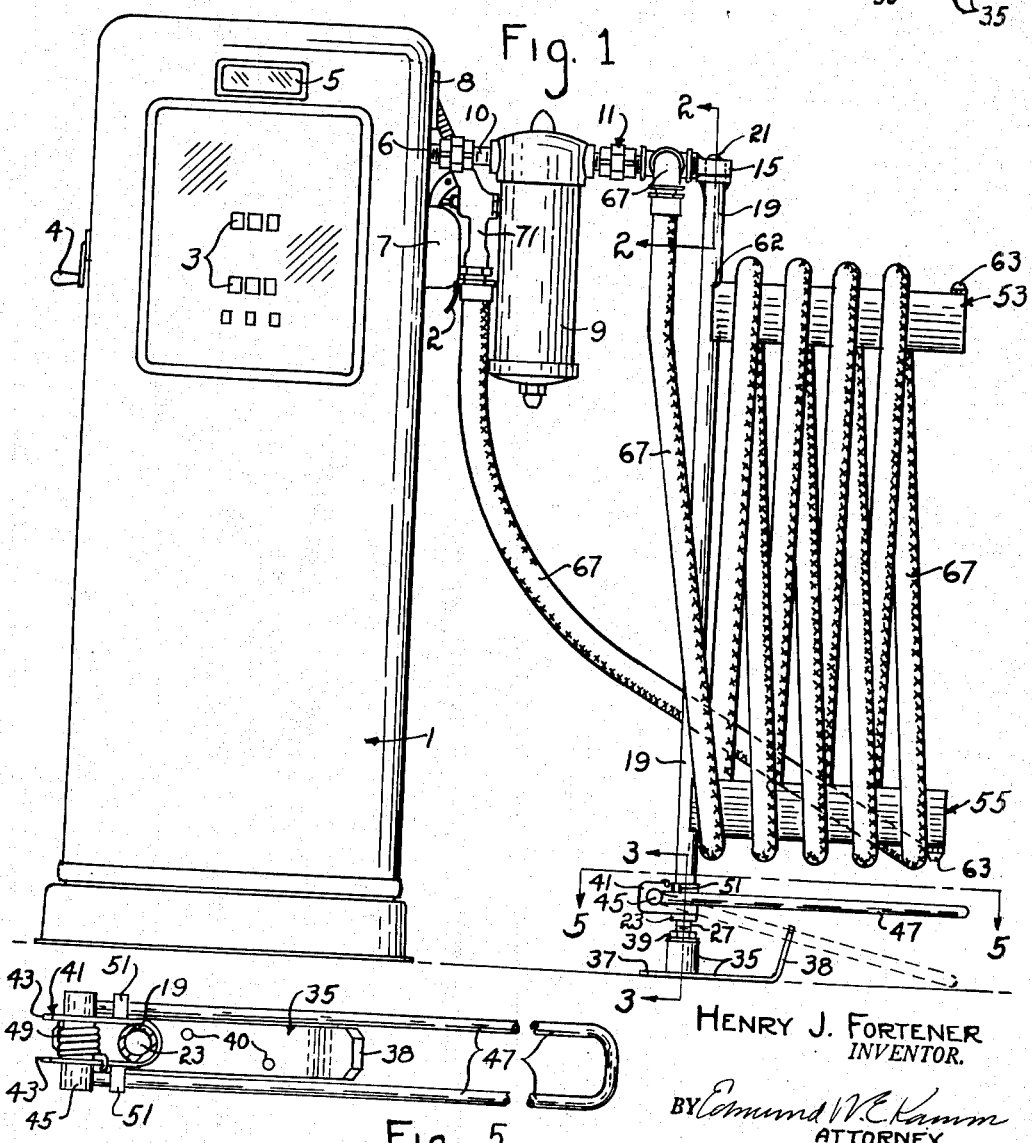
HENRY J. FORTENER
INVENTOR.
BY Edmund W. E. Kamm
ATTORNEY Patented June 15, 1954

2,681,251

UNITED STATES PATENT OFFICE 2,681,251

LIQUID DISPENSING APPARATUS

Henry J. Fortener, Fort Wayne, Ind., assignor to Bowser, Inc., Fort Wayne, Ind., a corporation of Indiana Application June 12, 1948, Serial No. 32,707

6 Claims. (Cl. 299—77)

This invention relates to a fluid dispensing apparatus, more specifically to a fluid dispensing apparatus having means for holding an exceptionally long hose suitable for servicing aircraft, busses and other vehicles which are difficult to park in the immediate proximity of the dispensing apparatus.

The advent of the small airport or landing strip has posed a fuel servicing problem, namely the need for an inexpensive, neat appearing dispensing apparatus having an adequate servicing radius. The ordinary service station dispensing pump, which is the basic unit of the device disclosed herein, will not accommodate a sufficient length of hose to service within the required radius and the existing aircraft fueling equipment is too expensive for the small airport or strip.

It is therefore an object of this invention to provide a fluid dispensing unit having a long servicing radius.

It is another object of this invention to provide a fluid dispensing unit having facilities for storing long servicing hose.

A further object of this invention is to provide a fluid dispensing unit having a hose storage rack that will pivot in the direction of service.

Yet another object of this invention is to provide a fluid dispensing unit having a hose storage rack from which the hose may be pulled regardless of the direction of pull.

It is still another object of this invention to provide a fluid dispensing apparatus having a pivotally mounted hose storage rack and means for holding the rack while coiling the hose on the rack.

Another object of the invention is to provide a hose support adjacent the usual service station dispenser for supporting a suitable length of hose but to connect the inlet end of the hose directly to the fluid conduit of the dispenser so as to eliminate all rotary joints in the liquid line, the twist of the conduit resulting from rotation of the support being absorbed by the hose.

These and other objects will become apparent from a study of this specification and the drawings which are attached hereto and are made a part hereof, and in which:

Figure 1 is an elevation of the device showing the pumping unit, the water separator, the hose storage rack, the hose in coiled position on the rack, and the hose nozzle resting upon its support on the pumping unit.

Figure 2 is a section taken on the line 2—2 of Figure 1 showing the hose rack top pivot and the discharge connection for the hose.

Figure 3 is a section taken on the line 3—3 of Figure 1 showing the hose rack lower pivot and the means for adjusting the elevation of the hose rack.

Figure 4 is a view taken from the right of Figure 1 showing the end of the top semi-cylindrical rack member and the pipe which support the hose.

Figure 5 is a section taken on the line 5—5 of Figure 1 showing the hose storage rack steadying means used in coiling the hose upon the rack.

Referring to the drawings the numeral 1 designates a fluid dispensing unit such as is commonly called a "filling station pump," which may be similar to that shown in Patent No. 2,229,370 issued January 21, 1941, to W. M. Carroll for Liquid Dispensing Apparatus, having a pumping unit, an air separator, and a meter (all not shown), a register 3, a register reset crank 4, a sight glass 5, a liquid discharge conduit 6, a nozzle support 7 and switch lever 2 and a nozzle boot 8. The pumping unit is generally connected to an underground storage tank.

A centrifugal or other type of water separator 9 is connected on the inlet side to the discharge conduit 10 and on the outlet side to a conduit 11 which terminates in a T 13. The far end of the T receives a special plug 15 having a bearing 17 formed in the end protruding from the T. The bearing pivotally supports the upper end of the pipe or column 19 which is provided with a cap 21 to close its upper end and a flange 20 to limit the movement of the pipe into the bearing.

The lower end of the pipe receives a plug or insert 23 having a shoulder 24 abutting against the lower end of the pipe and a vertical bore 25 extending upward, which receives a pin 27. The pin has a shoulder 29 abutting against the lower end of the insert 23 and has threads 31 at its lower end screwed into threads 33 of a base or foot 35, which turns upward at an angle and tapers inward from both sides on the end designated by the numeral 38. Holes 40 in the member 35 are used for mounting the unit in the field. The elevation of the pin 27 and therefore of the pipe 19 is governed by the position of the pin relative to the foot. This adjustment is operated until flange 20 adequately supports bearing 17 after which the jam nut 39 is tightened to hold the parts in adjusted relation.

A U-shaped bracket 41 is welded to the bottom end of the pipe 19 with its curved portion disposed around the enlarged portion of the insert 23 and with the two legs 43 extending beyond the pipe. Aligned holes are drilled in the legs and receive a pivot pin 45 which extends through the legs and has two holes drilled transversely of its axis, one on either side of the legs 43, to receive the ends of a U-shaped pedal 47 which is welded in place in the pin. The pedal is of sufficient width so that when the free end is depressed, the pedal will closely straddle the upturned end 38 of the member 37. A torsion spring 49 encircles the pin 45 between the legs 43 and urges the pin 45 and the pedal 47 in a counterclockwise direction as seen in Figure 1. Stops 51 extend out from the sides of the bracket 41 to hold the pedal in the horizontal position shown in Figure 1.

The two hose support members 53 and 55, are identical in construction and comprise a semi-cylindrical portion 57 of sheet metal which is closed at the other end by a semi-circular plate 59, while the free edges at the other end are tied together by a strap 61 welded into the concavity a short distance from the end. Each member is notched at 62, up to strap 61, to receive the pipe 19 and both the member and strap are welded to the pipe in such positions that the concave surfaces face each other. An acorn nut 63 is secured to the outer end of each member so as to project away from the concavity. The nuts are disposed substantially in axial alignment and prevent the coiled hose from slipping off the ends of the racks 53 and 55.

The members are spaced apart a suitable distance and are aligned with the pedal 47.

A nipple 65 is screwed into the side outlet of the T 13 and an elbow 67 is screwed to the other end of the nipple and pointed downward. The hose 69 is screwed into the nipple, wound in a figure 8 pattern around the members 53 and 55, beginning and ending with the lower member. The nozzle 71 is then placed upon the support 7 with the tip of the nozzle inserted into the boot 8.

Operation

Both the dispenser 1 and the hose rack shown in Figure 1 are mounted upon a concrete slab in the relation shown and connected to a fuel storage tank and to a source of power.

In order to dispense liquid the register 3 of the dispensing unit 1 is reset to zero by rotation of the crank 4, the nozzle 71 is removed from its support 7 and as the operator walks toward the vehicle to be serviced the rack will swivel to a position facing the operator and the hose 67 will uncoil from the members 53, 55 in response to the pull by the operator.

After servicing the vehicle, the switch lever 2 is returned to its support to shut off the power to the pumping motor, the rack is swung back by the operator so that the opening defined inside the U-shaped pedal 47 will slip over the end 38 of the base member 37 when the pedal is depressed. This will hold the rack steady while the hose is recoiled in the figure 8 pattern shown in Figure 1. When pressure on the pedal is released, spring 49 disconnects it from 38 so that the rack may again swivel.

The nozzle is then returned to the support 7 and the device is ready for a subsequent delivery.

It is obvious that the operator need not remove all of the hose, which is usually supplied in a 50-foot length, but only so much as is necessary to reach the vehicle tank.

The length of hose from L 67 to the member 55 will twist without damage so as to permit the rack to swivel through approximately 300 degrees.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a dispensing apparatus the combination of a liquid dispenser, a hose rack for a long, wet hose swivelly mounted on a base disposed adjacent to but separate from the dispenser, a long, wet hose connected to receive liquid from the dispenser and removably mounted on the rack and releasable means for holding said rack against swivelling.

2. In a dispensing apparatus the combination of a liquid dispenser, a hose rack for a long, wet hose swivelly mounted on a base disposed adjacent to but separate from the dispenser, a long, wet hose connected to receive liquid from the dispenser and removably mounted on the rack, releasable means for holding said rack against swivelling and means for automatically releasing said holding means.

3. In a dispensing apparatus the combination of a liquid dispenser having a rigid discharge conduit extending therefrom, a hose rack for a long, wet hose having a base disposed adjacent to but separate from said dispenser, a column pivotally mounted on the base, pivot means connecting the upper end of the column with said conduit, and a long, wet hose connected to receive liquid from said conduit and wound on said rack.

4. In a dispensing apparatus the combination of a liquid dispenser having a rigid discharge conduit extending therefrom, a hose rack for a long, wet hose having a base disposed adjacent to but separate from said dispenser, a column pivotally mounted on the base, pivot means connecting the upper end of the column with said conduit, a long, wet hose connected to receive liquid from said conduit and wound on said rack and a stop member projecting from said base and means mounted on said column cooperating therewith, said member and means being relatively movable to and from engaging position and when in said position serving to prevent pivoting of the column.

5. In a dispensing apparatus the combination of a liquid dispenser having a rigid discharge conduit extending therefrom, a hose rack for a long, wet hose having a base disposed adjacent to but separate from said dispenser, a column pivotally mounted on the base, pivot means connecting the upper end of the column with said conduit, a long, wet hose connected to receive liquid from said conduit and wound on said rack, a stop on said base, a second stop on said column mounted for movement to and from engaging position with respect to said first stop, said stops, when in said position serving to prevent pivoting of the column.

6. In a dispensing apparatus the combination of a liquid dispenser having a rigid discharge conduit extending therefrom, a hose rack for a long, wet hose having a base disposed adjacent to but separate from said dispenser, a column pivotally mounted on the base, pivot means connecting the upper end of the column with said conduit, a long, wet hose connected to receive liquid from said conduit and wound on said rack, a stop on said base, a second stop on said column mounted for movement to and from engaging position with respect to said first stop, said stops, when in said position serving to prevent pivoting of the column and means for normally holding said stops out of said position.

References Cited in the file of this patent

UNITED STATES PATENTS

| Number | Name | Date |
|---|---|---|
| 561,229 | Kern et al. | June 2, 1896 |
| 904,380 | Vader | Nov. 17, 1908 |
| 1,170,173 | Lund | Feb. 1, 1916 |
| 1,940,701 | Shope | Dec. 26, 1933 |
| 2,018,901 | Rush | Oct. 29, 1935 |
| 2,139,484 | Baird | Dec. 6, 1938 |
| 2,322,966 | Oberly | June 29, 1943 |
| 2,384,174 | Jones | Sept. 4, 1945 |
| 2,413,057 | Logan | Dec. 24, 1946 |